UNITED STATES PATENT OFFICE.

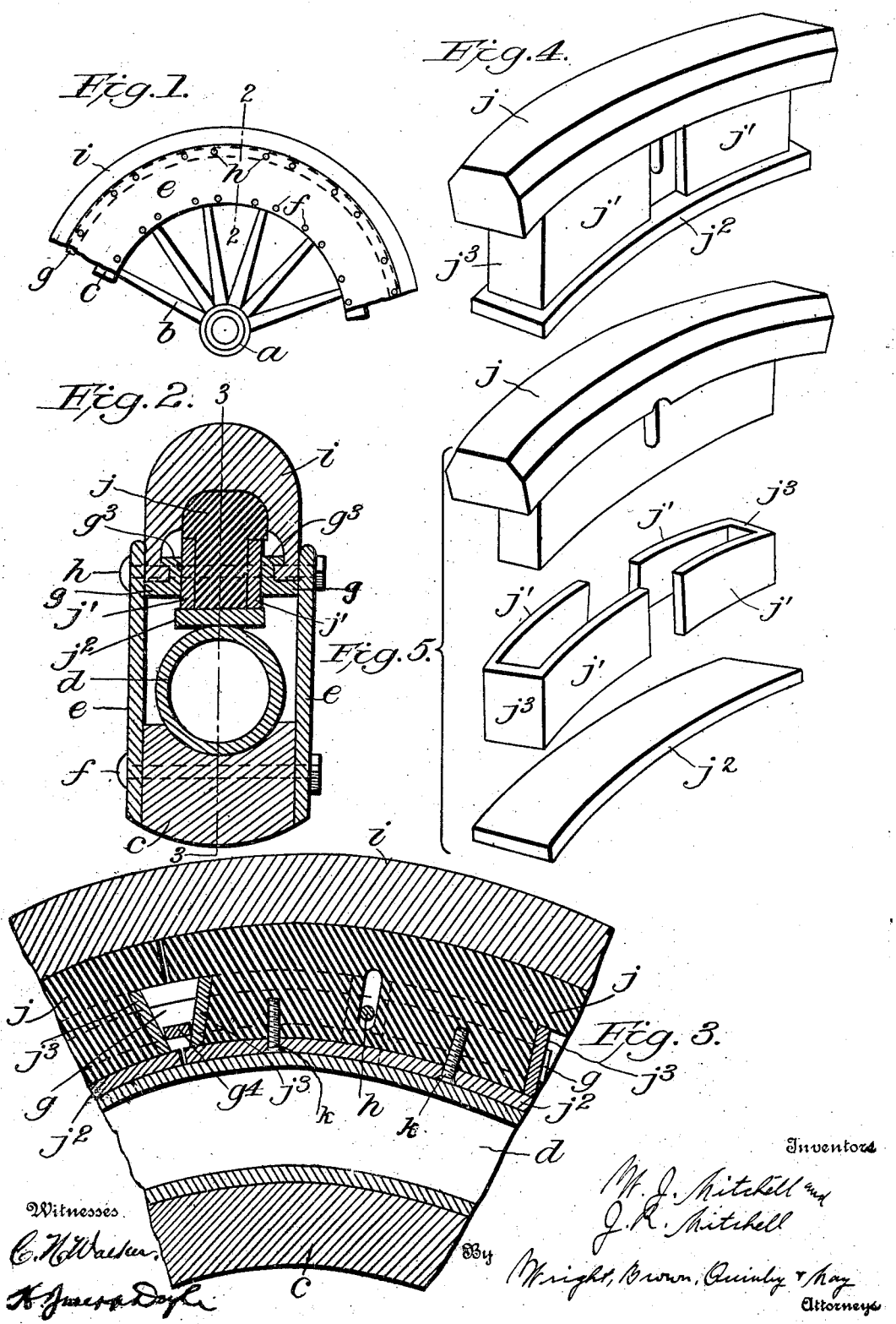

WINFIELD J. MITCHELL AND JAMES R. MITCHELL, OF LYNN, MASSACHUSETTS, ASSIGNORS TO THE MITCHELL PUNCTURELESS PNEUMATIC TIRE COMPANY, OF LYNN, MASSACHUSETTS, A CORPORATION OF MASSACHUSETTS.

VEHICLE-WHEEL.

No. 837,326.  Specification of Letters Patent.  Patented Dec. 4, 1906.

Application filed November 9, 1905. Serial No. 286,544.

*To all whom it may concern:*

Be it known that we, WINFIELD J. MITCHELL and JAMES R. MITCHELL, of Lynn, in the county of Essex and State of Massachusetts, have invented certain new and useful Improvements in Vehicle-Wheels, of which the following is a specification.

This invention relates to wheels for motor-vehicles and the like, the wheels having a tread or tire adapted to yield independently of the body of the wheel.

The invention relates particularly to wheels of the type shown in our application for Letters Patent of the United States filed January 11, 1905, Serial No. 240,526. In said application we show a wheel having a rigid rim provided at its sides with outwardly-projecting rigid flanges forming the sides of a deep recess, an air-tube located in said recess and protected by the sides and bottom thereof, the rim of the wheel constituting an inner seat on which the air-tube rests, two outer annular seats rigidly affixed to the rim and separated by an intermediate opening, a tread portion or tire engaged with and supported by said outer seats and made U-shaped in cross-section, and a series of leg-sections detachably seated in the tire and projecting between the outer seats, said leg-sections bearing upon the air-tube, so that the leg-sections and the main portion of the tire bearing thereon are yieldingly supported by the air-tube and are adapted to move toward and from the center of the wheel, the leg-sections sliding in and out in the leg-receiving opening between the outer seats.

The present invention has for its object to provide certain improvements in the construction of the leg-sections whereby their durability is increased and liability of chafing the air-tube is diminished.

The invention consists in the improvements which we will now proceed to describe and claim.

In the accompanying drawings, forming a part of this specification, Figure 1 represents a side elevation of a portion of a vehicle-wheel embodying our invention. Fig. 2 represents a section on line 2 2 of Fig. 1. Fig. 3 represents a section on line 3 3 of Fig. 2. Fig. 4 represents a perspective view of one of the improved leg-sections. Fig. 5 represents in perspective the parts of the leg-section disconnected.

The same letters of reference indicate the same parts in all the figures of the drawings.

In the drawings, $a$ represents the hub, $b$ the spoke, and $c$ the rim or felly, of a vehicle-wheel. The outer surface of the rim $c$ constitutes an inner seat which supports an air-tube $d$ of any suitable construction.

$e\ e$ represent flanges or side plates rigidly attached to the rim $c$ by bolts $f$ and projecting outwardly from the rim at opposite sides of the air-tube.

$g\ g$ represent two outer seats, which are annular metal bands or rings attached to the side plates $e\ e$ by bolts $h$ and held apart from each other by transverse space-bars $g^4$. The outer seats $g\ g$ are provided with hooked flanges $g^3$, adapted to engage the edge portions of the tread or tire $i$, the latter being U-shaped in cross-section and recessed to receive the leg-sections hereinafter described.

The construction thus far described is or may be identical with that shown in the above-mentioned application, the present invention relating principally to the construction of the leg-sections. The said leg-sections, as above stated, extend through the leg-receiving opening between the outer seats $g\ g$ and slide inwardly and outwardly between said seats. In our former application we have shown the leg-sections as made entirely of rubber, the sides of the sections bearing against the outer seats and being in rubbing contact therewith, while the inner faces of the sections bear upon the air-tube. We find that there are certain disadvantages resulting from the employment of wholly elastic leg-sections, these being as follows: First, the rubbing contact between the sides of the leg-sections and the outer seats $g\ g$ chafes or wears away the sides of the leg-sections and, moreover, is attended with considerable frictional resistance; second, the contact of the rubber inner faces of the leg-sections with the rubber air-tube causes chafing and wear of the air-tube on account of the frictional nature of the rubber of which the parts are composed. Hence there is some liability of rupturing the air-tube.

To overcome the above-recited objections, we construct the leg-section as follows: Each section is composed of a body portion $j$ of elastic material, such as rubber, metallic wear-pieces $j'$, applied to the sides of the body $j$ below the enlarged head portion thereof, and a facing-strip $j^2$ on the inner surface of the body $j$, said facing-strip having an antifrictional surface adapted to bear upon the air-tube $d$. The wear-pieces $j'$ are preferably arranged in two pairs for each leg-section, each pair of wear-pieces being connected by a neck $j^3$. The wear-pieces are of such length that they do not meet at the central portion of the body $j$, but are separated, so that they do not interfere with the flexibility of said body. The wear-pieces may be of any suitable metal and are arranged in rubbing contact with the outer seats $g$ $g$, so that they sustain the wear, preventing the chafing of the rubber body and diminishing the frictional resistance to the inward and outward movement of the leg-sections. The ends of the outer or head portion of the rubber body overhang the connecting-neck $j^3$, so that when the leg-sections are abutted together end to end, as shown in Fig. 3, recesses are formed between them for the reception of the space-bars $g^4$ between the outer seats $g$, as shown in Fig. 3. It will be seen, therefore, that the necks $j^3$ are the parts of the leg-sections that contact with the space-bars $g^4$. Said space-bars constitute stop members which prevent endwise creeping of the leg-sections and tire. The necks $j^3$ prevent the chafing and wear that would result from contact of the rubber leg-sections with the stop members. The antifrictional facing-strip $j^2$ is preferably a piece of sole-leather arranged with its grain surface outward or in contact with the air-tube. This grain surface is susceptible of a high polish, so that it constitutes a practically antifrictional surface, obviating all liability of chafing the air-tube. The strip $j^2$ is sufficiently flexible to prevent interference with the flexibility of the leg-sections. The facing-strip may be attached to the body portion $j$ of the leg-section by screws or other fastening devices $k$.

We claim—

1. A vehicle-wheel comprising a chambered rigid rim having an inner seat, and two outer seats separated by a leg-receiving space, a pneumatic cushion bearing on the inner seat, an elastic tire U-shaped in cross-section and having base portions permanently bearing on the outer seats, and a leg bearing on the pneumatic cushion and movable in said space, said leg being detachably seated in the tire and having wear-pieces in rubbing contact with the outer seats.

2. A vehicle-wheel comprising a chambered rigid rim having an inner seat, and two outer seats separated by leg-receiving space, a pneumatic cushion bearing on the inner seat, a U-shaped elastic tire having base portions permanently bearing on the outer seats, and a leg detachably seated in the tire and movable in said opening, the leg being composed of separable sections bearing on the pneumatic cushion, each section having wear-pieces in rubbing contact with the outer seats.

3. A vehicle-wheel leg-section comprising a resilient body portion, having a head adapted to be seated in a recessed tire, and a flexible antifrictional inner face adapted to bear on an air-tube.

4. A vehicle-wheel comprising a chambered rigid rim having a seat at its inner portion, a pneumatic cushion bearing on the said seat, an elastic tire having edge portions which are affixed to the rim between said seat and the tread portion of the tire, and are separated by a leg-receiving space, and a leg interposed between the tire and cushion and movable in said space, said leg being provided with a flexible antifrictional inner face adapted to bear on the pneumatic cushion.

5. A vehicle-wheel comprising a chambered rigid rim having an inner seat, a pneumatic cushion bearing on the said seat, an elastic tire having edge portions which are affixed to the rim between said seat and the tread portion of the tire, and are separated by a leg-receiving space, a leg interposed between the tire and cushion and movable in said space, an antifrictional facing-strip secured to the leg and bearing on the pneumatic cushion.

6. A vehicle-wheel leg-section comprising a resilient body portion having recessed ends and adapted to be seated in a recessed tire, and wear-pieces having side portions and necks adapted to protect the sides and the recessed ends of the body portion.

In testimony whereof we have affixed our signatures in presence of two witnesses.

WINFIELD J. MITCHELL.
JAMES R. MITCHELL.

Witnesses:
C. F. BROWN,
E. BATCHELDER.